Nov. 13, 1928.  
W. D. DEWEND  
1,691,565  
SOIL PULVERIZING IMPLEMENT  
Filed Jan. 28, 1924   2 Sheets-Sheet 1
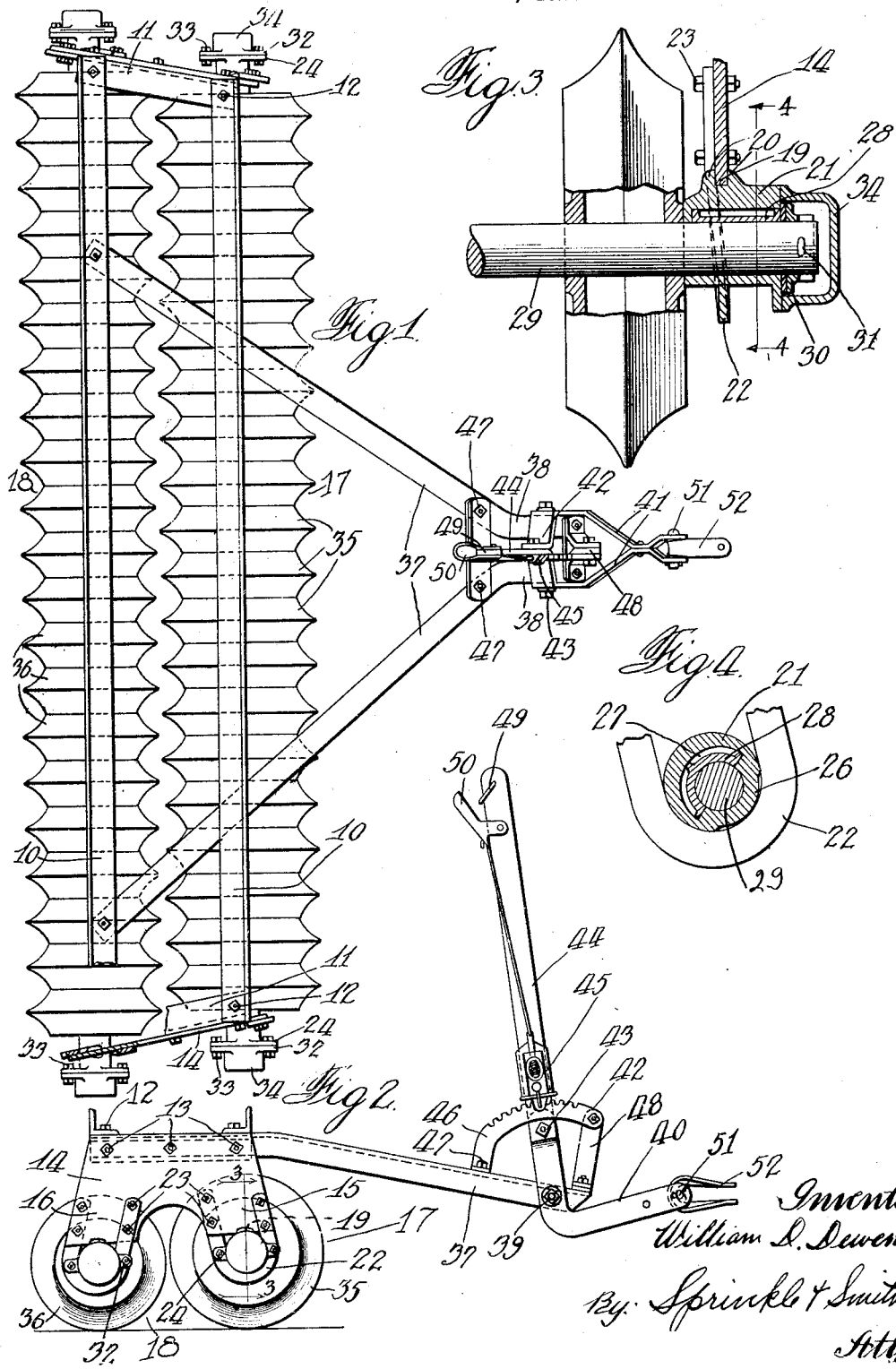

Nov. 13, 1928. 1,691,565
W. D. DEWEND
SOIL PULVERIZING IMPLEMENT
Filed Jan. 28, 1924   2 Sheets-Sheet 2
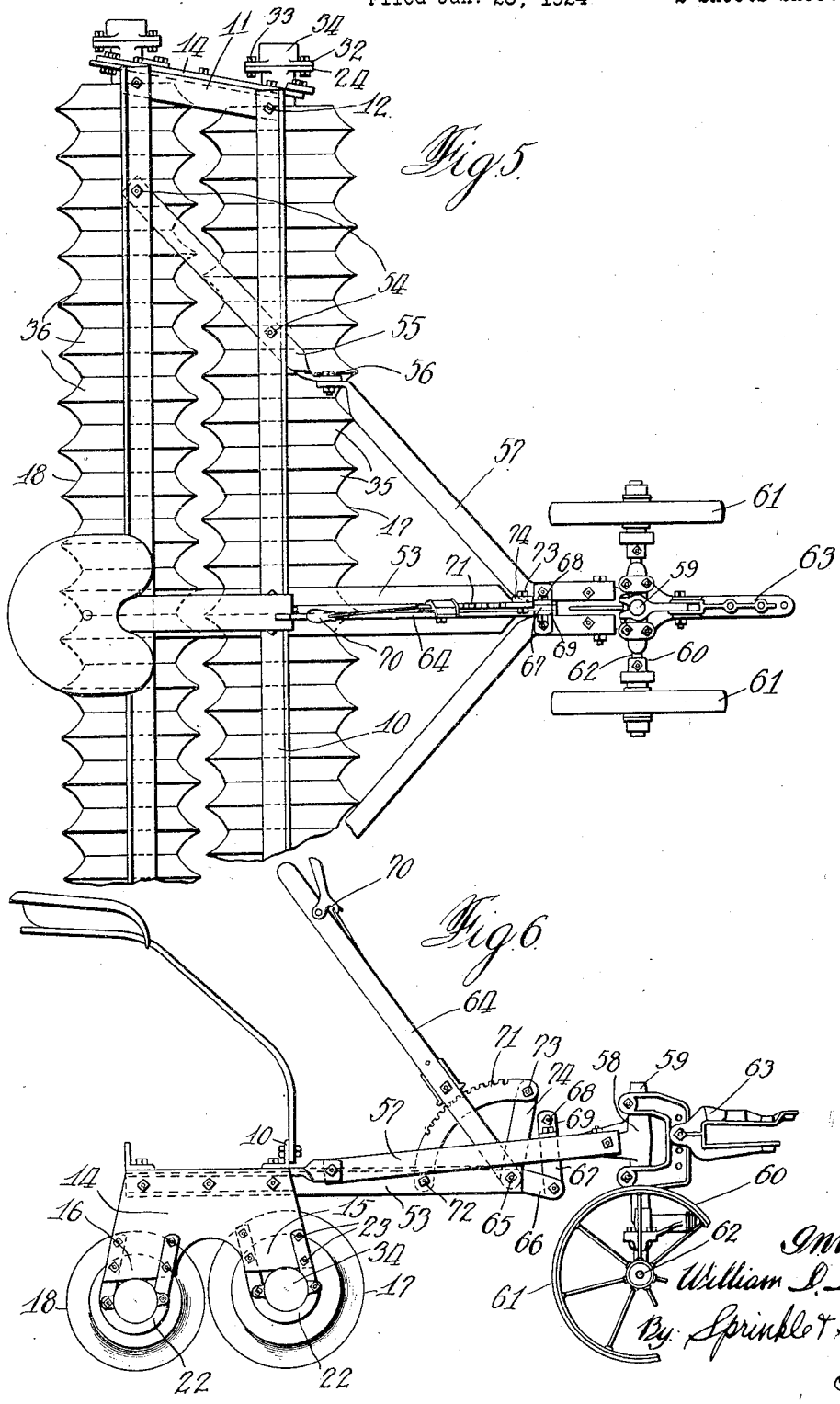

Patented Nov. 13, 1928.

1,691,565

UNITED STATES PATENT OFFICE.

WILLIAM D. DEWEND, OF SOUTH BEND, INDIANA, ASSIGNOR TO OLIVER CHILLED PLOW WORKS, A CORPORATION OF INDIANA.

SOIL-PULVERIZING IMPLEMENT.

Application filed January 28, 1924. Serial No. 688,978.

This invention relates to soil pulverizing implements and more particularly to improvements in that class of earth working implements commonly known as packers.

The construction of the packer in most common use at the present time is provided with a main frame which is pivotally mounted on the secondary frame, which, in turn, carries the two gangs of pulverizing discs. With this type of packer considerable difficulty has been experienced when extreme soft soil conditions are encountered because in these conditions the soil has a tendency to be dragged along and accumulate in front of the front gang of discs. This causes an increased pressure by reason of the pivotal construction on the front gang and in some instances lifts the rear gang entirely off the ground. In other words, there are some conditions of the soil in which the pivoted frame structure type of packer above described will not work satisfactorily. It is therefore one of the objects of the present invention to overcome this difficulty by providing a construction which can readily be adjusted in such a manner that the pressure on the front gang can be limited in such a way that the front gang will readily ride over the soil in these extreme conditions.

A further object of the invention is to provide an improved pulverizing implement by means of which the implement may be adjusted to vary the pressure on the front or rear gangs.

A still further object of the invention is to provide a rigid frame construction of a soil pulverizing implement having a plurality of draft elements operatively related in such a manner that the adjustment of one with respect to the other adjusts the plane passing through the axes of the gang with respect to the line of draft.

These and other objects are accomplished by providing a construction and an arrangement of the various parts in the manner hereinafter described and particularly pointed out in the appended claims.

Referring to the drawings, Fig. 1 shows a top plan view of the preferred form of my improved pulverizing implement.

Fig. 2 is a side elevational view of the implement shown in Fig. 1.

Fig. 3 is an enlarged detail view showing my improved construction for supporting the gang axles.

Fig. 4 is a cross sectional view taken on the lines 4—4 in Fig. 3.

Fig. 5 is a modified form of my improved pulverizing implement in which a front truck is used for supporting the front end of the implement, and Fig. 6 is a side elevational view of the pulverizer shown in Fig. 5.

For the purpose of illustration, I have shown my improved tractor drawn pulverizing implement comprising a main frame consisting of two transversely extending angles 10, which are secured to side angle members 11 by bolts 12. The rear angle member 10 is slightly longer than the front angle member and positions the side angle member 11 at a small angle with respect to the longitudinal center of the machine for positioning one more disc on the rear gang than is positioned on the front gang in order that the discs on both of these gangs may be in staggered relation with respect to each other. Secured to the side members 11 by means of bolts 13 are side or end brackets 14. The end brackets 14 are provided with forward and rearward leg portions 15 and 16, which are adapted to have secured thereto the front gang 17 and the rear gang 18, respectively. These gangs are mounted or detachably secured to the leg portions 15 and 16 by having the lower edges of these legs, as shown at 19, positioned between ears 20 formed on the bearing boxes 21. This construction prevents the lateral displacement of the bearing boxes with respect to the end brackets. These bearing boxes 21 are secured to the end brackets 14 by substantially U-shaped members 22, which are secured to the end brackets by bolts 23. The outer faces of the bearing boxes 21 are provided with oppositely disposed ears 24 for the purpose hereinafter set forth. The bearing boxes 21 are provided with semi-circular bearing portions 26 having bores therein of substantially the same diameter as the axles of the gangs on one side thereof and on the opposite side thereof are provided with relatively larger semi-circular bores 27. This construction forms a recess in the bearing boxes 21, which is adapted to receive a semi-circular soft metal bearing bushing 28. This semi-circular bushing 28 is so positioned in the bearing box 21 that the center thereof is in a position to sustain the wear caused by the downward pressure of the main frame on the bearings and the forward draft of the implement. The use of this semi-circular bearing bushing permits the easy replacement of repair parts and economizes in the costs of replacing these bushings in that only half the regular size bushing is used. Extending into the bearing boxes 21 are the usual front and rear axles 29 which are secured against lateral displacement by a collar 30 and a cotter 31. By having the ears 20 of the bearing boxes 21 spaced apart so as to loosely receive the forward and rearward leg portions 15 and 16 of the end brackets 14, the bearing boxes may rock laterally and vertically in such a manner as to properly align themselves with the shafts.

Secured to the ears 24 of the bearing boxes 21 by means of corresponding ears 32 and bolts 33 are dust caps 34 for completely encasing the outer ends of the bearing boxes. Loosely and rotatably mounted on the front and rear axles 29 are a plurality of discs 35 and 36, respectively, the front discs 35 being relatively larger than the rear discs 36. Secured to the main frame members 10 and converging toward the longitudinal center of the machine are draft members 37, which have their forward ends extending parallel and in spaced relation, as shown at 38. The draft members 37 are inclined downwardly as shown in Fig. 2 and have their forward ends pivotally connected at 39 to a supplemental draft member 40. The supplemental draft member 40 comprises two flat steel brackets 41, which are so formed as to engage the outer side of the forward end of the draft members 37, as clearly shown in Fig. 1. The upper end of one of these members has preferably formed integrally therewith the lever 44, which is provided with the usual detent mechanism 45. This detent mechanism is adapted to engage a sector 46 secured at its rearward end by means of bolts 47 to the draft members 37 and at its forward end to a bracket 48 secured to the front end of the member 37. This sector locks the lever in predetermined positions of adjustment. If it is desired to permit the implement to oscillate freely about its pivot 39 the detent mechanism may be held inoperative by a link 49 which may engage the handle 50 of the detent mechanism 45. The forward end of the supplemental draft member is pivotally connected by means of a bolt 51 to the draft bar 52 of the tractor.

From the above construction it will be seen that if the lever 44 is swung rearwardly, the draft member 37 together with the supplemental draft member 40 will be swung downwardly about the fixed pivot 51 on the tractor, thereby increasing the pressure on the front gang 17 and relieving the pressure on the rear gang 18, and if it is desired to reverse the pressure on these gangs, the lever 44 is swung forwardly.

From the above construction it will be noted that when extremely soft soil conditions are encountered the lever may be swung forwardly so that the angle of a plane passing through the axes of the gang may be inclined upwardly with respect to the line of draft in such a manner that the front gang will readily ride over the soft soil and thereby prevent the accumulation of the soil ahead of the front gang. It will further be noted from this construction that in the operation of my improved implement in the field, should varying conditions in the soil be encountered, the implement may be readily adjusted by the operator from the tractor seat without any loss of time.

In the modified form of my improved horse drawn pulverizing implement I have provided a draft member 53 which is secured to the main frame member 10 at the longitudinal center of the machine. Secured to the main frame members 10 on the opposite sides thereof by means of bolts 54 are brackets 55. Pivoted to these brackets 55 by means of bolts 56 are truck frame members 57. These truck frame members converge forwardly toward the longitudinal center of the machine and have secured at their forward ends a bearing member 58, which is pivotally mounted on a shaft 59 of the front truck 60. The front truck 60 is provided with the usual supporting wheels 61, axles 62 and adjustable draft brackets 63. The draft member 53 is adjustably connected to the truck frame by means of a lever 64, which is pivoted to the draft member 53 at 65. Formed integrally with the lever 64 and extending below the pivot 65 is an arm 66, which is pivotally connected to a link 67, which, in turn, is pivoted by a bolt 68 to bracket 69. The lever is locked in predetermined positions of adjustment by a detent mechanism 70, which engages a sector 71. The sector 71 has its rear end secured by means of bolt 72 to the draft members 53 and the other end secured by a bolt 73 to a bracket 74, which, in turn, has its lower end thereof secured to the draft member 53.

From the above description, it will be seen that if the operator desires to increase the pressure on the front gang 17 the lever is swung downwardly and rearwardly about its pivot 65 causing the arm 66 of the lever 64 to swing downwardly about its pivot on the link 67, thereby causing the draft member 53 to assume an inclined position downwarly with respect to the line of draft and thereby increasing the pressure on the front gang. If it is desired to increase the pressure on the rear gang and relieve the pressure on the front gang the lever 64 is swung forwardly, thereby swinging the arm 66 of the lever 64 upwardly about its pivot on the link 67, and elevating the draft member 53 with respect to the truck frame members 57, thereby relieving the pressure on the front gang in such a manner that any extreme soft soil conditions will not interrupt the efficient operation of the machine.

From the above description it will be seen that I have provided an improved pulverizing implement which can be quickly and readily adjusted by the operator of the machine to meet the varying conditions encountered in the field without the necessity of stopping to make adjustments.

While in the above specification I have described the preferred embodiments of my invention, it will of course be understood that the same is capable of modification and that modification may be made without departing from the spirit and scope of the invention as expressed in the following claims.

What I claim as my invention and desire to secure by Letters Patent is:

1. In a soil pulverizing implement, the combination of a frame, front and rear pulverizing gangs operatively connected to said frame by a pair of parallel axles fixed in relation to said frame and extending from side to side thereof, a draft member rigidly secured to said frame, a supplemental draft member pivotally connected to said first mentioned draft member and extending forwardly therefrom and being adapted to be supported at a relatively fixed height at the forward end thereof, a hand lever operatively related to said draft members for adjusting said members with respect to each other to vary the pressure on said front and rear gangs.

2. In a soil pulverizing implement, the combination of a frame, front and rear pulverizing gangs operatively connected to said frame by a pair of parallel axles fixed in relation to said frame and extending from side to side thereof, a draft member rigidly secured to said frame, a supplemental draft member extending forwardly of said first mentioned draft member, and a hand lever formed integrally with said supplemental draft member and operatively related to said first mentioned draft member for adjusting said members with respect to each other to vary the pressure on said front and rear gangs.

3. In a soil pulverizing implement, the combination of a frame, front and rear pulverizing gangs operatively connected to said frame by a pair of parallel axles fixed in relation to said frame and extending from side to side thereof, a draft member rigidly secured to said frame, a supplemental draft member operatively connected to said first mentioned draft member, and means operatively related to said draft members for adjusting said members with respect to each other to tilt said frame in a manner to cause the weight of said frame and rear gang to be carried by said front gang.

4. In a soil pulverizing implement, the combination of a frame, front and rear pulverizing gangs operatively connected to said frame by a pair of parallel axles fixed in relation to said frame and extending from side to side thereof, a drafted member rigidly secured to said frame, a supplemental draft member operatively connected to said first mentioned draft member and extending forwardly therefrom and being adapted to be supported at a relatively fixed height at the forward end thereof, and a hand lever operatively related to said draft members for adjusting said members with respect to each other to tilt said frame and gangs in a manner to cause the weight of said frame to be carried by one or the other or both of said gangs.

In testimony whereof I have signed my name to this specification, this 22nd day of Jan., A. D. 1924

WILLIAM D. DEWEND.